R. M. HOLDEN.
SEPARABLE FASTENER.
APPLICATION FILED JUNE 20, 1917.
1,264,072. Patented Apr. 23, 1918.
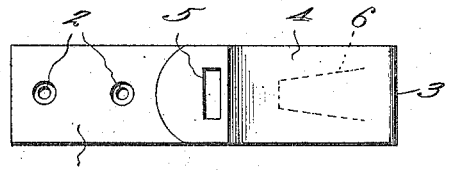
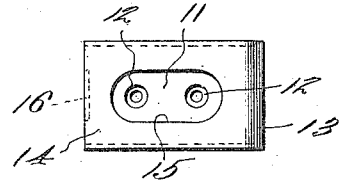
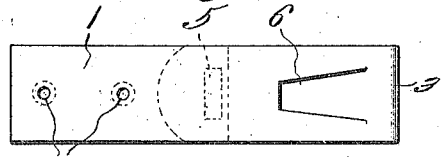
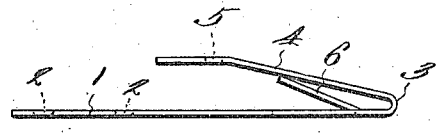
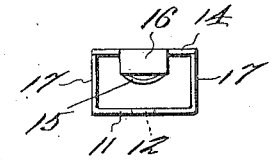
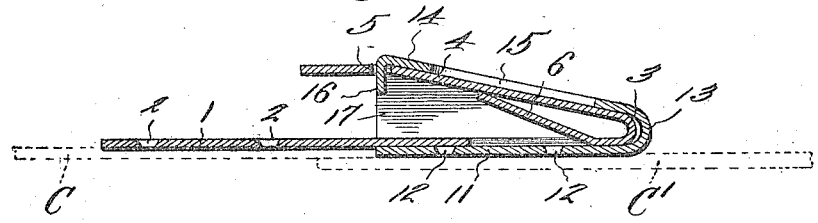
WITNESSES
INVENTOR
R. M. Holden,
BY Victor J. Evans
ATTORNEY

UNITED STATES PATENT OFFICE.

RICHARD MERIDAN HOLDEN, OF KENOSHA, WISCONSIN.

SEPARABLE FASTENER.

1,264,072.  Specification of Letters Patent.  Patented Apr. 23, 1918.

Application filed June 20, 1917. Serial No. 175,892.

*To all whom it may concern:*

Be it known that I, RICHARD M. HOLDEN, a citizen of the United States, residing at Kenosha, in the county of Kenosha and State of Wisconsin, have invented new and useful Improvements in Separable Fasteners, of which the following is a specification.

This invention relates to separable fasteners comprising a head and a socket, and more especially those closing axially and including a resilient head; and the object of the same is to produce a fastener of this type adapted particularly for connecting automobile curtains and the like.

The invention comprises a male member and a female member, both stamped from sheet metal and a portion of the male member or head being tempered so as to make it resilient, while the female member or socket may be resilient or not as desired. These members or elements are provided with means for attaching them to the curtains or other objects to be connected or fastened by the device. Further details will appear in the following specification, reference being had to the accompanying drawings wherein:—

Figure 1 is a top plan view, Fig. 2 a bottom plan view, and Fig. 3 an edge view partly in section of the male member carrying the head.

Fig. 4 is a top plan view, Fig. 5 a longitudinal sectional view, and Fig. 6 an end elevation of the female member or socket.

Fig. 7 is an enlarged longitudinal sectional view of two members connected with each other and showing them as fastening together the meeting edges of curtains which latter are illustrated only in dotted lines.

As suggested above, the members of this fastener are by preference made of sheet metal, which, especially for the male member, may be in strip form, whereas the female member is herein described as having upturned sides connecting its upper and lower portions and therefore if stamped from strip metal the strip must be wider. I have used this device for fastening curtains such as those employed on automobiles and the like, and these curtains are designated by the reference letters C, C' in the drawings, but I do not wish to be limited to this use of the fastener as it is obviously intended for detachably connecting one element to another. When employed as I have used it, the members are provided with means for attaching them to the curtains, which will be described below. The parts are of the desired sizes and specific formation as to design, and the metal will be treated to prevent rust and to present a neat appearance.

Coming now to the details and referring first to the male member carrying the head, as seen in Figs. 1, 2 and 3, the strip metal is left flat for part of its length to constitute a base, and the outer end of the base 1 is perforated for fastening devices such as rivets or is stamped with holes for the reception of eyelets as shown at 2. At the inner end of the base it is bent upward as at 3 and the metal carried back over the base in a lip 4 whose length is about half that of the base as seen. The latter beneath the lip may be tempered or hardened to give it certain resiliency which it must possess, as will be clear from the operation as described below. Near its free extremity the lip is provided with an opening in the shape of a transverse slot 5. The base is cut out as best seen in Fig. 2 to produce a tongue 6, and in the finished article as seen in Fig. 3 this tongue is upbent from the base so that its free end stands near the slot 5 and gives greater rigidity to the entire lip. I have not found it necessary to attach the tip of the tongue to the lip, as it has heretofore been considered sufficient to let such tip rest against the tongue, but this detail is unimportant.

Referring now to Figs. 4, 5 and 6 which illustrate the female member, the same also has a flat base 11 with openings for rivets or eyelets 12, the base is bent at one end 13 and carried thence back over itself in a top plate 14 which is provided with an opening or slot 15 for a purpose yet to appear, and the free extremity of this plate is bent down into a hook 16. As seen in Fig. 6, the sides 17 of the base plate 11 may be upbent and their upper edges rigidly connected with the top 14, and if so the female element becomes a box-like socket whose parts are rigid so that it may not yield; but if these sides are omitted it will be clear that the top 14 will have a certain resiliency with respect to the base 11, due to the fact that they are connected only by the bend 13.

The assembly of the members and their manner of attachment to the curtains or other elements C, C' is best seen in Fig. 7. In this view the male member is shown as having been pressed into the female member, and each as connected by its rivets or eyelets with the element C or C', which as suggested above, may be an automobile curtain or the like. In so connecting the parts of the fastener, the bend 3 of the male member is passed into the open end of the female member as seen in Fig. 6 and pressed forward until it nearly or quite contacts with the bend 13 thereof. During this movement the base 1 slides over the base 11 and across the heads of the rivets or eyelets 12, whereas the lip 4 slides beneath the top plate 14 and is sprung downward slightly by the tip of the hook 16. It will now be clear that the upper end of the tongue 6 should not close the opening or slot 5, because when the parts reach their completely assembled position as seen in Fig. 7, the hook 16 is engaged by the slot 5 as the lip 4 spring upward. This leaves the tip 9 of the lip 4 projecting beyond the open end of the female member or socket, and when the members are again to be disconnected all that is necessary is to depress this tip so as to disengage the slot 5 from the hook 16. If the metal of the male member is properly tempered, it is possible to omit the tongue 6 entirely, but as there is no especial use for all of the metal in the base 1 of the male member beyond or to the right of that portion which is provided with the eyelets 2, it is quite obvious that the stamping out and upbending of the tongue 6 may be easily accomplished without interfering with the remaining parts, and it certainly gives greater strength to the lip 4. Also it will be clear that if the metal of the female member is properly tempered, the sides 17 may not be necessary. As to the details I would not, therefore, be limited. The longitudinal slot or opening 15 in the top plate 14 of the female member is for the purpose of permitting the insertion of an appropriate tool through the top of this member so that the fastening devices or eyelets 12 may be reached when this member is to be attached to the element C'. There is no necessity for an equivalent opening in the male member, because the lip 4 and its tip 9 do not extend back sufficiently far to overlie the attaching devices 2 and they can be easily reached from above. If said devices are eyelets suggested herein, they may of course be easily reached from the rear side of the curtains or elements C and C'.

What is claimed as new is:—

1. In a separable fastener, the combination with a male member comprising a flat base having attaching means at one end and a head at the other end, said head including a lip overlying the base and provided with a transverse slot, and a tongue on the base bent upward to support said lip; of a female member comprising a flat base having attaching means, and an overlying top plate pierced with an opening above said attaching means, the free extremity of said top plate being bent downward into a hook to engage the slot in said lip.

2. In a separable fastener, the combination with a male member comprising a flat base having attaching means at one end and the other end bent upward into a lip overlying the base and provided near its free extremity with a transvere slot, and a tongue stamped out of the base and bent upward to support said lip; of a female member comprising a flat base having attaching means and bent upward at one end into a top plate whose extremity is bent downward into a hook to engage said slot in the lip, the sides of the base plate being bent upward and their upper edges connected with said top plate.

In testimony whereof I affix my signature.

RICHARD MERIDAN HOLDEN.

Copies of this patent may be obtained for five cents each, by addressing the "Commissioner of Patents, Washington, D. C."